US011956597B2

(12) United States Patent
Jidge et al.

(10) Patent No.: US 11,956,597 B2
(45) Date of Patent: Apr. 9, 2024

(54) AUDIO SYNCHRONIZATION FOR HEARING DEVICES

(71) Applicant: Starkey Laboratories, Inc., Eden Prairie, MN (US)

(72) Inventors: Chaitanya Jidge, Chanhassen, MN (US); Jacob Christian Kyro, Bloomington, MN (US); Jeffrey Paul Solum, Greenwood, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 120 days.

(21) Appl. No.: 17/756,791

(22) PCT Filed: Dec. 3, 2020

(86) PCT No.: PCT/US2020/070848
§ 371 (c)(1),
(2) Date: Jun. 2, 2022

(87) PCT Pub. No.: WO2021/113868
PCT Pub. Date: Jun. 10, 2021

(65) Prior Publication Data
US 2023/0007411 A1 Jan. 5, 2023

Related U.S. Application Data

(60) Provisional application No. 62/942,954, filed on Dec. 3, 2019.

(51) Int. Cl.
*H04R 25/00* (2006.01)
*H04W 56/00* (2009.01)

(52) U.S. Cl.
CPC ........ *H04R 25/554* (2013.01); *H04W 56/001* (2013.01); *H04R 2225/021* (2013.01); *H04R 2225/023* (2013.01); *H04R 2225/025* (2013.01)

(58) Field of Classification Search
CPC .... H04R 25/55; H04R 25/554; H04R 25/556; H04R 25/558; H04W 56/00; H04W 56/001; H04W 56/0015
See application file for complete search history.

(56) References Cited

U.S. PATENT DOCUMENTS 9,742,471 B1 8/2017 Thoen
10,455,312 B1 10/2019 Chen et al.
(Continued)

FOREIGN PATENT DOCUMENTS

WO WO-2007031907 A2 3/2007
WO WO-2021113868 A1 6/2021

OTHER PUBLICATIONS

"International Application Serial No. PCT/US2020/070848, International Search Report dated Mar. 16, 2021", 4 pgs.
(Continued)

*Primary Examiner* — Thang V Tran
(74) *Attorney, Agent, or Firm* — Schwegman Lundberg & Woessner, P.A.

(57) ABSTRACT

Disclosed herein are systems and methods for audio synchronization for hearing devices. An audio packet is received from a host device at a first hearing device configured to be worn in a first ear of a wearer, the audio packet compatible with a wireless low energy digital communication protocol, and the audio packet is received from the host device at a second hearing device configured to be worn in a second ear of the wearer. Upon one or more programmable conditions, a synchronization packet is sent from the first hearing device to the second hearing device. An acknowledgment packet is sent from the second hearing device to the first hearing device upon receipt of the synchronization packet, and a first transducer at the first hearing device and a second transducer at the second hearing device are
(Continued)

unmuted to deliver synchronized audio to the first ear and to the second ear.

20 Claims, 4 Drawing Sheets

(56) References Cited

U.S. PATENT DOCUMENTS

| | | | |
|---|---|---|---|
| 10,904,666 B2* | 1/2021 | Pedersen | H04R 25/554 |
| 11,089,411 B2* | 8/2021 | Dickman | H04R 25/554 |
| 2006/0013208 A1 | 1/2006 | Rietschel et al. | |
| 2008/0291863 A1 | 11/2008 | Agren | |
| 2012/0087503 A1 | 4/2012 | Watson et al. | |
| 2014/0177864 A1 | 6/2014 | Kidron | |
| 2015/0341724 A1* | 11/2015 | Pedersen | H04W 4/80 |
| | | | 381/300 |
| 2016/0234612 A1* | 8/2016 | Solum | H04R 25/554 |
| 2017/0041726 A1 | 2/2017 | Jarvis et al. | |
| 2017/0098466 A1 | 4/2017 | Elliot et al. | |
| 2017/0195769 A1* | 7/2017 | Chang | H04R 1/1016 |
| 2019/0104424 A1* | 4/2019 | Hariharan | H04L 1/1621 |
| 2019/0230459 A1* | 7/2019 | Sridharan | G06F 3/16 |
| 2020/0053460 A1 | 2/2020 | Pedersen et al. | |
| 2020/0359134 A1* | 11/2020 | Tong | H04R 5/04 |
| 2021/0409856 A1* | 12/2021 | Zhu | H04R 5/033 |
| 2022/0116492 A1* | 4/2022 | Zhu | H04L 65/80 |

OTHER PUBLICATIONS

"International Application Serial No. PCT/US2020/070848, Written Opinion dated Mar. 16, 2021", 6 pgs.

"International Application Serial No. PCT US2020 070848, International Preliminary Report on Patentability dated Jun. 16, 2022", 8 pgs.

* cited by examiner

AUDIO SYNCHRONIZATION FOR HEARING DEVICES

CLAIM OF PRIORITY

This patent application is a U.S. National Stage Filing under 35 U.S.C. 371 from International Application No. PCT/US2020/070848, filed on Dec. 3, 2020, and published as WO 2021/113868, which claims the benefit of priority to U.S. Application Ser. No. 62/942,954, filed Dec. 3, 2019, each of which are incorporated by reference herein in their entirety.

TECHNICAL FIELD

This document relates generally to wireless communication for hearing device systems and more particularly to audio synchronization for hearing device applications.

BACKGROUND

Examples of hearing devices, also referred to herein as hearing assistance devices or hearing instruments, include both prescriptive devices and non-prescriptive devices. Specific examples of hearing devices include, but are not limited to, hearing aids, headphones, assisted listening devices, and earbuds.

Hearing aids are used to assist patients suffering hearing loss by transmitting amplified sounds to ear canals. In one example, a heating aid is worn in and/or around a patient's ear. Hearing aids may include processors and electronics that improve the listening experience for a specific wearer or in a specific acoustic environment.

Hearing aids may also incorporate wireless transceivers for enabling wireless communication with an external device and/or communication between two hearing aids (left and right ear) worn by a user. When streaming audio signals from an external device, synchronization of the audio between left and right hearing aids is needed.

SUMMARY

Disclosed herein, among other things, are systems and methods for audio synchronization for hearing device applications. A method includes receiving an audio packet from a host device at a first hearing device configured to be worn in a first ear of a wearer, the audio packet compatible with a wireless low energy digital communication protocol, and receiving the audio packet from the host device at a second hearing device configured to be worn in a second ear of the wearer. Upon one or more programmable conditions, a synchronization packet including a sequence number associated with the audio packet is sent from the first hearing device to the second hearing device. An acknowledgment packet is sent from the second hearing device to the first hearing device upon receipt of the synchronization packet, and a first transducer at the first hearing device and a second transducer at the second hearing device are unmuted to deliver synchronized audio to the first ear using the first transducer and to the second ear using the second transducer.

Various aspects of the present subject matter include a system including a first hearing device configured to be worn in a first ear of a wearer, the first hearing device configured to receive an audio packet from a host device, where the audio packet is compatible with a wireless low energy digital communication protocol. The system also includes a second hearing device configured to be worn in a second ear of the wearer, the second hearing device configured to receive the audio packet from the host device. The first hearing device and the second hearing device each include one or more processors and memory programmed with instructions that when executed by the one or more processors, cause the one or more processors to perform the steps of: upon one or more programmable conditions, initiating a synchronization procedure by wirelessly sending a synchronization packet including a sequence number associated with the audio packet from the first hearing device to the second hearing device; wirelessly sending an acknowledgment packet from the second hearing device to the first hearing device upon receipt of the synchronization packet; unmuting a first transducer at the first heating device and a second transducer at the second hearing device; and delivering synchronized audio to the first ear using the first transducer and to the second ear using the second transducer.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
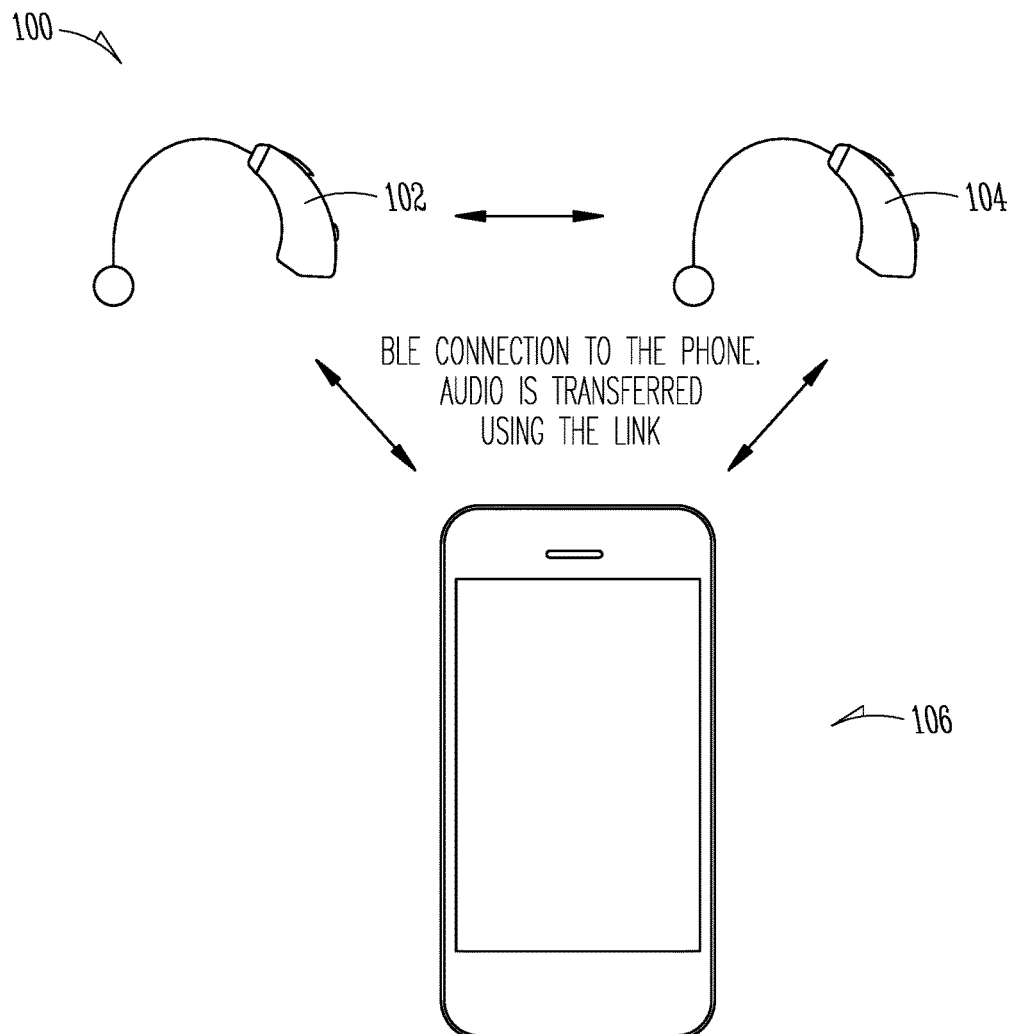
FIG. 1 illustrates a block diagram of a system for audio synchronization for hearing device applications, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing devices generally, including earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

Bluetooth™ Low Energy (BLE) connections are made between a master device and one or more slave devices. This topology is referred to as a piconet. Radio controllers and in particular the radio controller in the master device is responsible for the scheduling of events, and those events must be scheduled with one or more slave devices. In addition, the radio controller must mitigate other competing radio connections such as WiFi connections and even cellular connections if the controller is part of a smart phone or media device. The master controller, based on these competing multiple access wireless systems, will schedule the events of the slave devices in the Bluetooth™ piconet. At any time, this master controller may modify connections and their relative timing between devices. This is problematic if the master is delivering packets containing synchronized audio bound for multiple slave devices, and as such it is the responsibility of the slave devices to maintain synchronization for rendering those packets if the two devices are ear worn left and right stereo audio sink devices.

In previous cases of transferring audio to left and right hearing devices, some systems use classic Bluetooth™ instead of the BLE protocol to avoid synchronization problems. Other previous systems use a pre-determined time delay (delta) between the left and right audio devices. However, using a pre-determined delta between the left and right devices means the audio source is assumed to have control over the BLE controller to place the events for these devices at that delta, requiring the source to implement a special BLE stack to co-exist with standard BLE.

The present subject matter provides systems and methods for synchronizing audio between left and right audio channels arriving asynchronously via wireless protocols, with an undetermined time offset. In some embodiments, the present subject matter can be used to synchronize audio coming from Android™ devices using an audio streaming for hearing aid (ASHA) protocol or over a generic attribute protocol (GATT) from devices such as MyEye™ devices from OrCam™, in various embodiments. When an Android™ (or any BLE host) transmits audio to a pair of sink devices (such as hearing devices) using ASHA or GATT, the audio packets arrive asynchronously to the left and right side. Therefore, the audio cannot be played as it arrives since there is phase delay which is not fixed from stream to stream and the amount of this delay is not provided to hearing devices. Thus, the left and right ear audio packets should be synchronized as provided by the present subject matter before they are presented to the user, so that the user has a good listening experience.

FIG. 1 illustrates a block diagram of a system 100 for audio synchronization for hearing device applications, according to various embodiments of the present subject matter. In various embodiments, audio events are sent over a BLE connection from a master/host device 106 to two slave/sink devices, such as one left hearing device 102 and one right hearing device 104, where each slave/sink device is sent one audio event per audio interval. The master/host device 106 may include any device capable of wireless audio signals, including but not limited to a streaming device, MyEye™ device, laptop, tablet or smartphone. The audio signals sent by the master/host device 106 may be of a stereo nature where the left and right channels are time synchronized at the source or they may be monaural in which case the left and right audio information is the same in each audio channel. In either case the slave/sink devices 102, 104 should render the information synchronously. The time division nature of the wireless transport events may come in any order (left first then right, or vice versa), and any spacing between left and right events up to the audio interval are possible and could for example be any number between 2.5 milliseconds (msec) to 17.5 msec if the audio interval is 20 msec, in an embodiment.

Audio packets sent from the master/host device 106 are acknowledged by the slave devices 102, 104 when received correctly, and may be retransmitted by the master when the slave does not send an acknowledgement. The audio packets typically have sequence numbers with a modulo counter associated with the packets. To help mitigate lost packets, a packet buffer is typically implemented in each receiver in case packets are lost temporarily over the link. Buffer underflows may occur if the packet error rate is too high or if the receiver is not phase locked to the transmitter. Buffer underflows indicate a re-synchronization is required between receivers.

To aid in synchronization, the present subject matter provides a direct wireless connection between the left device 102 and the right device 104. The direct wireless ear-to-ear connection is used to synchronize the rendering of received audio packets, in various embodiments. In one embodiment, the wireless ear-to-ear connection is made using a BLE communication protocol. In another embodiment, the ear-to-ear connection is uses Near Field Magnetic induction (NFMI). Other types of connections and other types of wireless communication protocols can be used for the direct ear-to-ear connection without departing from the scope of the present subject matter. In the direct wireless ear-to-ear connection, in some embodiments one of the devices (left or right) acts as the master device for the connection between the left and right devices, and each of the left and right devices is capable of acting as the master device in various embodiments. If the devices are powered on and in a connection with one another, the audio sent from a master device such as a cell phone remains muted on both devices until synchronization is achieved, in various embodiments. If one of the ear-worn devices is out of range of the other ear-worn device or powered off, then the available device may decide to render the audio sent from the master, in various embodiments.

In various embodiments of the synchronization procedure of the present subject matter, each audio packet sent from the master/host of the audio link contains a sequence number. The synchronization algorithm starts when one of the devices that is in the ear-to-ear connection receives an audio packet from the master device of the audio connection, in various embodiments. One of the devices that is in the ear-to-ear connection, on one of the following connection intervals, sends a synchronization packet (including the sequence number of the audio packet from its audio packet buffer that it expects to render) to the other device that is in the ear-to-ear connection, in an embodiment. The other device of the ear-to-ear connection then acknowledges receipt of the synchronization packet, and may then render the same audio packet from its packet buffer. Once the synchronization packet is sent by one device in the ear-to-ear connection and acknowledged successfully by the other device in the ear-to-ear connection, both sides may unmute their audio and begin delivering the synchronized audio to their output transducers thus ensuring audio synchronization between the devices receiving the audio, in various embodiments.

To maintain synchronization between the devices receiving the audio (left and right hearing devices, for example), several methods may be employed. In one embodiment, the devices may from time to time either periodically or randomly re-synchronize or at least ensure synchronization by sending messages containing information about the present audio sequence that each device is preparing to render. In another embodiment, if an underflow of an audio buffer is indicated on either receiving device, that receiving device should initiate the synchronization procedure. In an embodiment, the radio controller may inform the host device if link layer connection parameters have been modified such that the audio interval, connection interval or connection phase has been modified. This information can be used by the radio host processor to signal that synchronization between left and right receiving devices should be activated on the ear-to-ear link between the devices as described above and shown in FIGS. 3A-3B. In another embodiment, the left and right hearing devices may maintain a counter between packets received from the master of the audio connection. This counter can be on the order of 1 microsecond (μsec) increments, for example. Under normal circumstances, packets will be received at the audio interval corresponding to the radio connection interval. However, under channel conditions that cause packets to be lost, or packets which are received in error, or when the master device has not scheduled an audio packet to be sent in the audio interval, successful audio packets may take more than one connection interval to be received.

Figure 2:
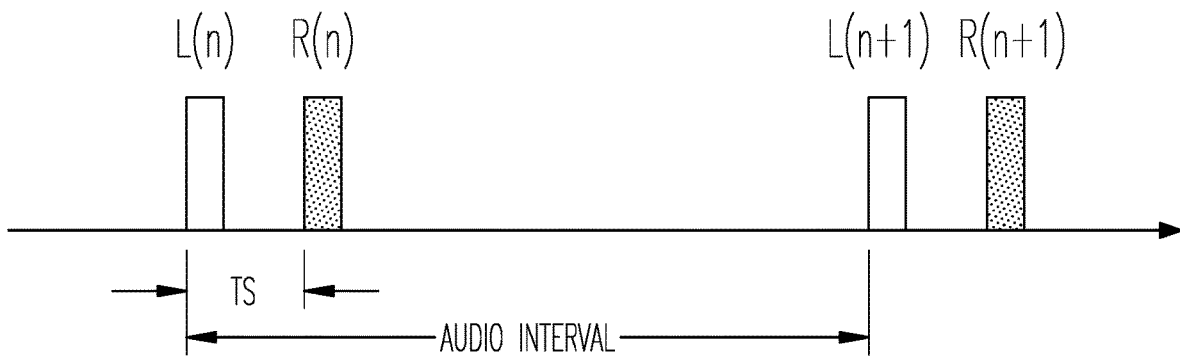
FIG. 2 illustrates a graphical diagram showing timing of reception of audio packets in a system for audio synchronization for hearing device applications, according to various embodiments of the present subject matter.
Figure 3A:
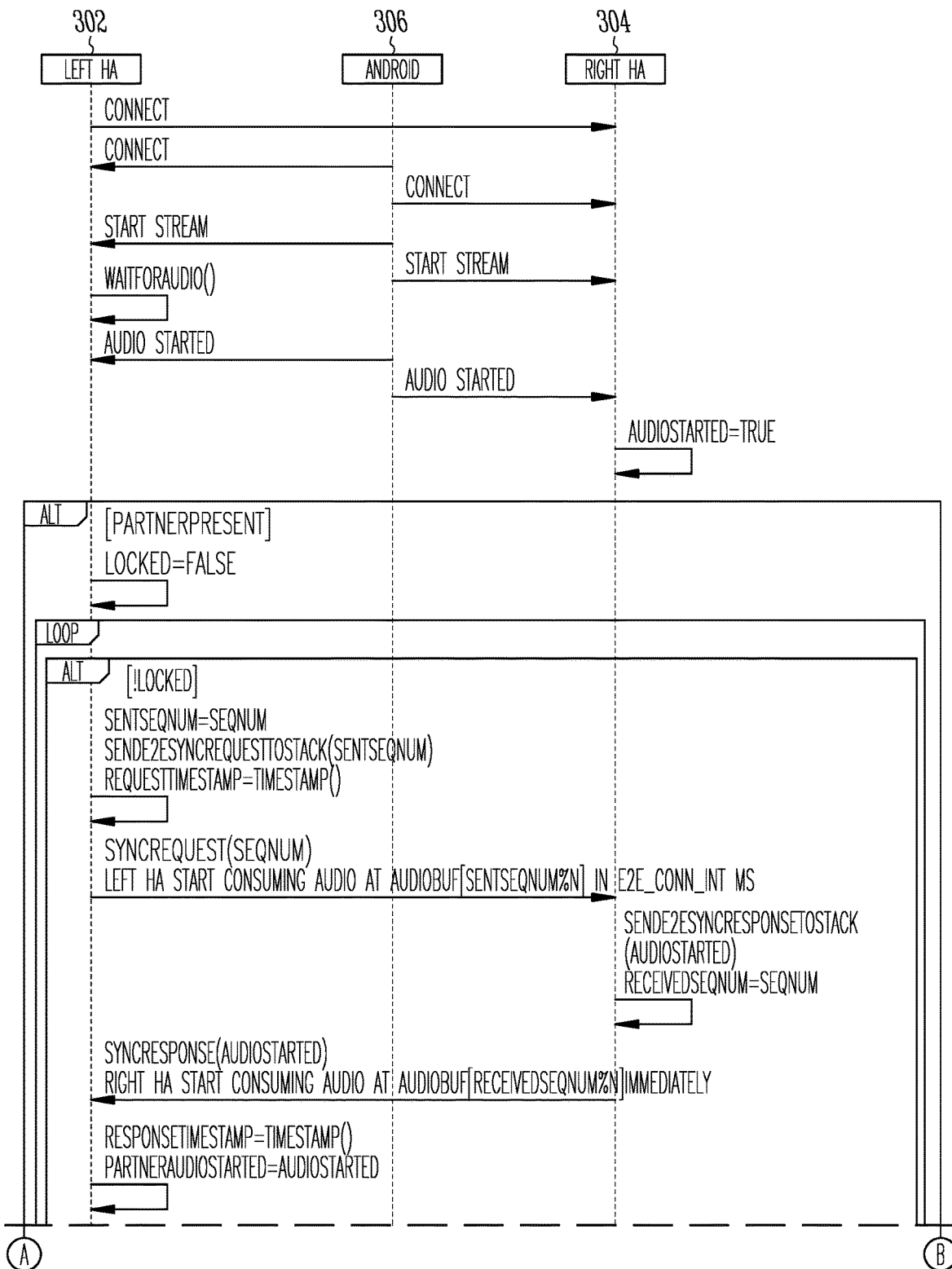
FIGS. 3A-3B illustrates a flow diagram of a method for audio synchronization for hearing device applications, according to various embodiments of the present subject matter.
Figure 3B:
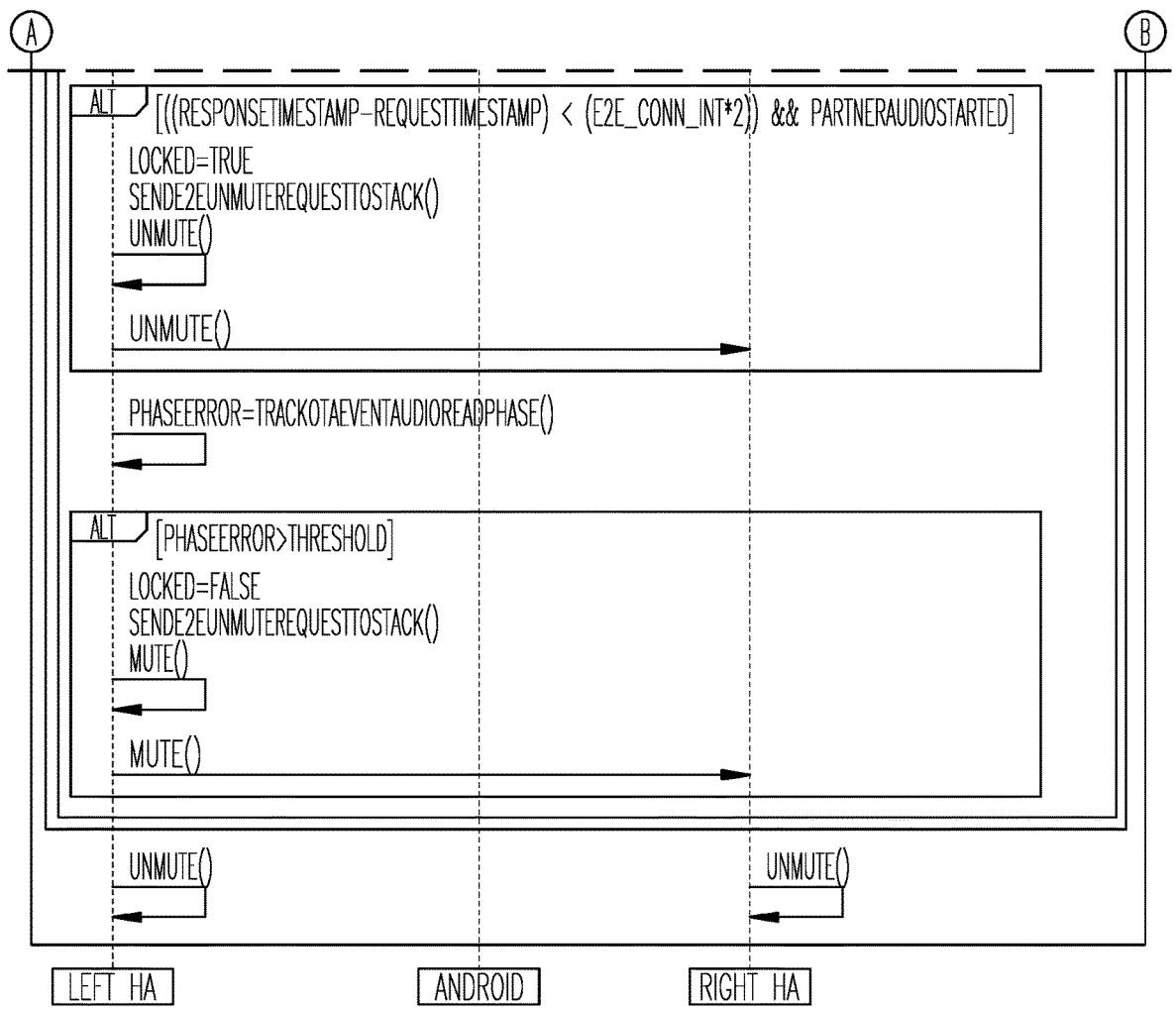

FIG. 2 illustrates a graphical diagram showing timing of reception of audio packets in a system for audio synchronization for hearing device applications, according to various embodiments of the present subject matter. For example, in an audio interval of 20 msec, if a packet is not received due to packet loss it may take 40 or 60 msec to receive a successful packet. The local timer at one of the ear-worn devices which is timing the interval between subsequent audio packets may indicate the time it took to receive the next packet as being longer than the expected value of 20 msec, thus indicating a potential packet lost. Subsequent packets may however be received faster than normal since the master is allowed to transmit pending packets from the host immediately within the same connection event once a packet is acknowledged from the slave, thus allowing the master to "catch up". Once the slave is receiving packets again at the 20 msec interval, the slave can assume that both sides are caught up. At the point at which a slave or master has reached the point of having caught up and packets are being received at a normal interval, the slave can look back at the intervals recorded by its packet interval timer and determine if there has been a change of phase and if so, initiate a resynchronization on the ear-to-ear link as shown in FIGS. 3A-3B, which illustrates a flow diagram of a method for audio synchronization for hearing device applications including a host device 306, a left hearing device 302 and a right hearing device 304, according to various embodiments of the present subject matter. The application may mute the audio until synchronization is re-established using the synchronization method described above and shown in FIGS. 3A-3B.

As an example, if the connection interval is 20 msec and a packet is lost, the timer will indicate a packet interval of 40 msec, however the next packet may come in at 1.25 msec later. If the subsequent packet comes in at 18.75 msec then all is normal and no synchronization is required. If, on the other hand, the next packet was received after having received a packet 1.25 msec later, at an interval other than 18.75 msec+n(20 msec) where n is an integer, then the phase of the sent packet has changed and a synchronization procedure should be restarted, in various embodiments.

In another case, if a packet is received at an interval of greater than the audio interval and less than twice the audio interval, then the phase of this audio interval is changed and the device should initiate a synchronization procedure between the ear-worn devices. In various embodiments, additional circumstances that may trigger a re-synchronization include, but are not limited to: (1) an audio packet found in the receive buffer containing a sequence number that is out of order; (2) an underflow of the audio buffer has been detected; (3) a packet is received sooner than expected when packet has loss detection has been cleared; (4) a packet loss has been detected and packet loss has been cleared but the average packet timing once the packet loss is cleared does not equal the audio interval; or (5) a packet is first lost indicated by an audio packet not being received at the audio interval but instead is received at a time equivalent to (n times the audio interval), where n is an integer, indicating a packet loss. The slave device having experienced this situation should keep track of its reception timer. If at any time after having recorded this first loss of packet, the algorithm begins which keeps track of each subsequent packet timings.

Figure 4:
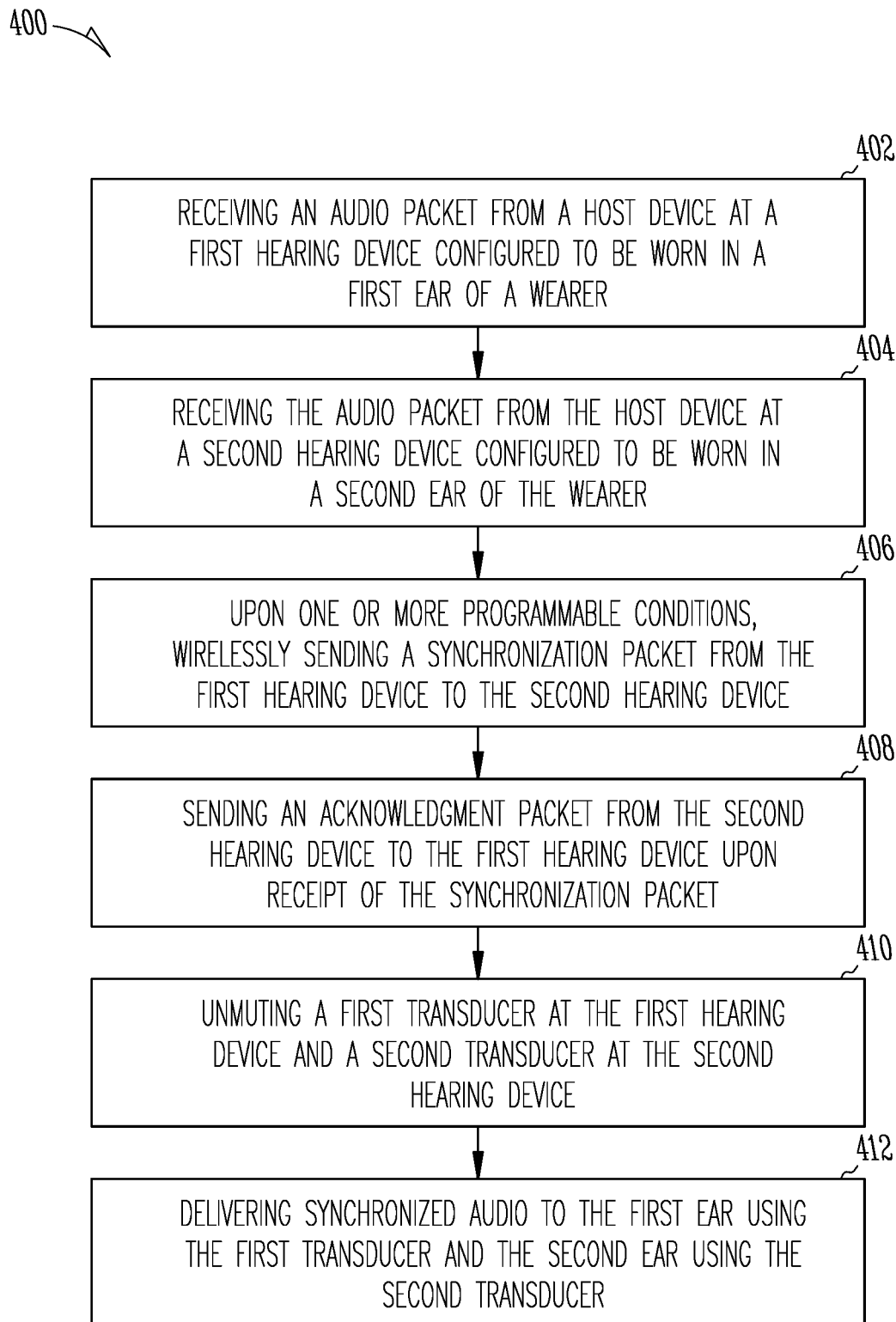
FIG. 4 illustrates a flow diagram of a method for audio synchronization for first and second hearing devices, according to various embodiments of the present subject matter.

FIG. 4 illustrates a flow diagram of a method for audio synchronization for first and second hearing devices, according to various embodiments of the present subject matter. The method 400 includes receiving an audio packet from a host device at a first hearing device configured to be worn in a first ear of a wearer, at step 402, the audio packet compatible with a wireless low energy digital communication protocol, and receiving the audio packet from the host device at a second hearing device configured to be worn in a second ear of the wearer, at step 404. At step 406, upon one or more programmable conditions, a synchronization packet including a sequence number associated with the audio packet is sent from the first hearing device to the second hearing device. An acknowledgment packet is sent from the second hearing device to the first hearing device upon receipt of the synchronization packet, at step 408, and a first transducer at the first hearing device and a second transducer at the second hearing device are unmated, at step 410, to deliver synchronized audio to the first ear using the first transducer and to the second ear using the second transducer, at step 412.

In various embodiments, the one or more programmable conditions includes an initial connection with the host device by the first hearing device or the second hearing device, receiving a first or initial audio packet from the host device, an underfloor of an audio buffer is indicated on the first hearing device or the second hearing device, a change to link layer connection parameters is indicated (such as a modification of an audio interval, a connection interval, or a connection phase), exceeding a threshold on a packet interval timer on one or more of the first hearing device and the second hearing device, and/or a programmable time after receiving the audio packet by the first hearing device or the second hearing device. The wireless low energy digital communication protocol includes a Bluetooth™ Low Energy (BLE) communication protocol, in various embodiments.

Various aspects of the present subject matter include a system including a first hearing device configured to be worn in a first ear of a wearer, the first hearing device configured to receive an audio packet from a host device, the audio packet compatible with a wireless low energy digital communication protocol. The system also includes a second hearing device configured to be worn in a second ear of the wearer, the second hearing device configured to receive the audio packet from the host device. The first hearing device and the second hearing device each include one or more processors and memory programmed with instructions that when executed by the one or more processors, cause the one or more processors to perform the steps of: upon one or more programmable conditions, initiating a synchronization procedure by wirelessly sending a synchronization packet including a sequence number associated with the audio packet from the first hearing device to the second hearing device; wirelessly sending an acknowledgment packet from the second hearing device to the first hearing device upon receipt of the synchronization packet; unmuting a first transducer at the first hearing device and a second transducer at the second hearing device; and delivering synchronized audio to the first ear using the first transducer and to the second ear using the second transducer.

According to various embodiments, the wireless low energy digital communication protocol includes a Bluetooth™ Low Energy (BLE) communication protocol. Other communication protocols can be used without departing from the scope of the present subject matter. In various embodiments, at least one of the first hearing device and the second hearing device is a wireless earbud or a portion of a headset. In one embodiment, the wireless ear-to-ear connection includes a BLE communication protocol. In another embodiment, the ear-to-ear connection includes a Near Field Magnetic Induction (NEVI) connection or communication protocol. Other types of wireless communication protocols or connections can be used for the ear-to-ear connection without departing from the scope of the present subject matter. In some embodiments, at least one of the first hearing device and the second hearing device is a hearing aid, such as an in-the-ear (ITE) hearing aid, a behind-the-ear (BTE) hearing aid, in-the-canal (ITC) hearing aid, a receiver-in-canal (RIC) hearing aid, or a completely-in-the-canal (CIC) hearing aid. Other types of hearing devices can be used without departing from the scope of the present subject matter.

The present subject matter provides several benefits. For example, the present subject matter provides for the synchronization of audio between the left and right audio channels arriving asynchronously via wireless, with an undetermined time offset. Also, hearing devices with existing processing technology can be used to perform left and right synchronization without requiring special elements in a BLE stack. In addition, a resynchronization can be performed based on programmable events including, but not limited to: upon initial connection with the audio source, upon a connection parameter update, upon the start of streaming audio, or after a certain programmable time period.

Various embodiments of the present subject matter support wireless communications with a hearing device. In various embodiments the wireless communications may include standard or nonstandard communications. Some examples of standard wireless communications include link protocols including, but not limited to, Bluetooth™, Bluetooth™ Low Energy (BLE), IEEE 802.11(wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various embodiments, the battery is rechargeable. In various embodiments multiple energy sources are employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in devices whether such devices are standard or custom fit and whether they provide an open or an occlusive design. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method, comprising:
    receiving an audio packet from a host device at a first hearing device configured to be worn in a first ear of a wearer, the audio packet compatible with a wireless low energy digital communication protocol;
    receiving the audio packet from the host device at a second hearing device configured to be worn in a second ear of the wearer;
    upon one or more programmable conditions, initiating a synchronization procedure by wirelessly sending a synchronization packet including a sequence number associated with the audio packet from the first hearing device to the second hearing device;
    wirelessly sending an acknowledgment packet from the second hearing device to the first hearing device upon receipt of the synchronization packet;
    unmuting a first transducer at the first hearing device and a second transducer at the second hearing device; and
    delivering synchronized audio to the first ear using the first transducer and to the second ear using the second transducer.

2. The method of claim 1, wherein the one or more programmable conditions includes an initial connection with the host device by the first hearing device or the second hearing device.

3. The method of claim 1, wherein the one or more programmable conditions includes receiving a first or initial audio packet from the host device.

4. The method of claim 1, wherein the one or more programmable conditions includes an underflow of an audio buffer is indicated on the first hearing device or the second hearing device.

5. The method of claim 1, wherein the one or more programmable conditions includes a change to link layer connection parameters is indicated.

6. The method of claim 5, wherein the change to link layer connection parameters includes a modification of an audio interval.

7. The method of claim 5, wherein the change to link layer connection parameters includes a modification of a connection interval.

8. The method of claim 5, wherein the change to link layer connection parameters includes a modification of a connection phase.

9. The method of claim 1, wherein the one or more programmable conditions includes exceeding a threshold on a packet interval timer on one or more of the first hearing device and the second hearing device.

10. The method of claim 1, wherein the one or more programmable conditions includes a programmable time after receiving the audio packet by the first hearing device or the second hearing device.

11. The method of claim 1, wherein the wireless low energy digital communication protocol includes a Bluetooth™ Low Energy (BLE) communication protocol.

12. A system, comprising:
    a first hearing device configured to be worn in a first ear of a wearer, the first hearing device configured to receive an audio packet from a host device, the audio packet compatible with a wireless low energy digital communication protocol;
    a second hearing device configured to be worn in a second ear of the wearer, the second hearing device configured to receive the audio packet from the host device;
    wherein the first hearing device and the second hearing device each include one or more processors and memory programmed with instructions that when executed by the one or more processors, cause the one or more processors to perform the steps of:
        upon one or more programmable conditions, initiating a synchronization procedure by wirelessly sending a synchronization packet including a sequence number associated with the audio packet from the first hearing device to the second hearing device using an ear-to-ear connection;
        wirelessly sending an acknowledgment packet from the second hearing device to the first hearing device using the ear-to-ear connection upon receipt of the synchronization packet;
        unmuting a first transducer at the first hearing device and a second transducer at the second hearing device; and
        delivering synchronized audio to the first ear using the first transducer and to the second ear using the second transducer.

13. The system of claim 12, wherein the ear-to-ear connection includes a Bluetooth™ Low Energy (BLE) communication protocol.

14. The system of claim 12, wherein the ear-to-ear connection includes a Near Field Magnetic Induction (NFMI) connection.

15. The system of claim 12, wherein at least one of the first hearing device and the second hearing device is a hearing aid.

16. The system of claim 15, wherein the hearing aid includes an in-the-ear (ITE) hearing aid.

17. The system of claim 15, wherein the hearing aid includes a behind-the-ear (BTE) hearing aid.

18. The system of claim 15, wherein the hearing aid includes an in-the-canal (ITC) hearing aid.

19. The system of claim 15, wherein the hearing aid includes a receiver-in-canal (RIC) hearing aid.

20. The system of claim 15, wherein the hearing aid includes a completely-the-canal (CIC) hearing aid.

* * * * *